United States Patent [19]

Raghavan et al.

[11] Patent Number: 5,859,605

[45] Date of Patent: Jan. 12, 1999

[54] DIGITAL WAVEFORM GENERATOR AND METHOD FOR SYNTHESIZING PERIODIC ANALOG WAVEFORMS USING TABLE READOUT OF SIMULATED Δ-Σ ANALOG-TO-DIGITAL CONVERSION DATA

[75] Inventors: Gopal Raghavan, Canoga Park; Joseph F. Jensen, Malibu, both of Calif.

[73] Assignee: Hughes Electronics Corporation, El Segundo, Calif.

[21] Appl. No.: 789,176

[22] Filed: Jan. 24, 1997

[51] Int. Cl.$^6$ ..................................... H03M 3/00
[52] U.S. Cl. .................. 341/143; 341/152; 341/131; 341/166
[58] Field of Search ................... 341/126, 131, 341/142, 143, 144, 146, 152, 166

[56] References Cited

U.S. PATENT DOCUMENTS

| | | | |
|---|---|---|---|
| 4,320,361 | 3/1982 | Kikkert | 332/112 |
| 5,041,831 | 8/1991 | Boyhley et al. | 341/144 |
| 5,182,558 | 1/1993 | Mayo | 341/118 |
| 5,245,345 | 9/1993 | Kohdaka et al. | 341/152 |
| 5,268,688 | 12/1993 | Meyers et al. | 341/143 |
| 5,495,504 | 2/1996 | Yasuda | 375/281 |
| 5,497,152 | 3/1996 | Wilson et al. | 341/143 |
| 5,541,600 | 7/1996 | Blumenkrantz et al. | 341/139 |
| 5,563,535 | 10/1996 | Corry et al. | 341/143 |
| 5,600,320 | 2/1997 | Wilson et al. | 341/144 |
| 5,606,319 | 2/1997 | Yatim et al. | 341/144 |

OTHER PUBLICATIONS

Louis A. Williams, "MIDAS", Version 2.1, Stanford University, 1990.
"Section VI, Sigma–Delta ADCs and DACs, Sigma–Delta Overview", *Mastering the Mix in Signal Processing*, Mixed-Signal Design Seminar, 1991, pp. VI–1 through VI–24.
Boser et al., "Simulating and Testing Oversampled Analog to–Digital Converters", *IEEE Transactions on Computer Aided Design*, vol. 7, No. 6, Jun. 1988, pp. 668–674.
Horowitz et al., "Active Filters and Oscillators", *The Art of Electronics*, Cambridge University Press, 1989, pp. 263–283.
Wai–Kai Chen, Editor–in–Chief, *The Circuits and Filters Handbook*, CRC Press, 1995, pp. 2339–2371.
Heij et al., "Transconductor and Integrator Circuits for Ietegrated Bipolar Video Frequency Filters", *Proceeding of ISCAS*, 1989, pp. 114–117.
Voorman et al., "Integration of Analog Filters in a Bipolar Process", *IEEE Journal of Solid State Circuits*, vol. SC–17, Aug. 1982, pp. 713–722.
Veirman et al., "Design of a Bipolar 10 Mhz Programmable Continuous Time 0.05° Equiripple Linear Phase Filter", *IEEE Journal of Solid–State Circuits*, vol. SC–27, Mar. 1992, pp. 324–331.
Gyles, C. "*800 Ms/s Arbitratry Function Generator*" IEEE Transactions on Instrumentation and Measurement, vol. 39, No. 1, Feb. 1, 1990, pp. 96–100.

*Primary Examiner*—Jeffrey Gaffin
*Assistant Examiner*—Kim Huynh
*Attorney, Agent, or Firm*—V. D. Duraiswamy; W. K. Denson-Low

[57] ABSTRACT

A digital waveform generator reads out simulated ΔΣ ADC data for a desired periodic analog waveform from a memory and converts it, using a low-resolution high speed DAC, into a synthesized analog waveform. The ΔΣ digital waveform generator is preferably designed to take advantage of the natural evolution of device technologies. The memory is fabricated with older technologies, which tend to be slower but have a much higher integration. The DAC is implemented in more recent technologies, which are faster but have less integration. A speed up buffer or buffers in intermediate speed intermediate integration technologies may be included to provide a bridge between the low speed memory and the low integration DAC. As the current technologies become more well developed, and thus more integrated, and new higher speed technologies take their place, the technologies for the various components will gradually change, but the architecture should remain viable and superior to the known digital generators.

35 Claims, 4 Drawing Sheets

DIGITAL WAVEFORM GENERATOR AND METHOD FOR SYNTHESIZING PERIODIC ANALOG WAVEFORMS USING TABLE READOUT OF SIMULATED Δ-Σ ANALOG-TO-DIGITAL CONVERSION DATA

BACKGROUND OF THE INVENTION

1. Field of the Invention

This invention relates to digital data synthesis (DDS) of analog waveforms and more specifically to a digital waveform generator and method for synthesizing periodic analog waveforms using table readout of simulated delta-sigma (ΔΣ) analog-to-digital conversion data.

2. Description of the Related Art

Waveform generators are used extensively in transmitters and receivers in audio, radar, satellite and cellular telephone communications systems as well as in other applications such as calibration and test systems. The generation of stable, accurate and high resolution periodic analog waveforms over a wide frequency range is critical to the performance of these systems. For example, a high frequency carrier signal, e.g. a sinewave, is modulated by an information signal for transmission over a communications channel. At the other end of the channel, the same sinewave is used to demodulate the signal. Any distortion in the sinewaves induces distortion in the received information signal.

Known waveform generators are implemented with both analog and digital architectures. The analog waveform generators use crystal oscillators to generate the fundamental sinewaves and then synthesize the different sinewaves to produce a desired waveform. Current analog generators can produce waveforms up to approximately 100 GHz, but the signal-to-noise ratio (SNR) is poor due to harmonics and distortion. Any arbitrary frequency can be generated from DC to 100 GHz, but extensive feedback circuitry is required to control the frequency stability of the waveforms.

Known digital waveform generators store samples of a desired periodic analog waveform as N-bit codewords in a high speed memory. Typically, samples for one or more periods of the desired waveform are stored and read out cyclically to generate an N-bit digital waveform. An N-bit DAC converts the successive codewords into an analog waveform having $2^N$ discrete levels. The waveform is then passed through a smoothing filter to generate the synthesized periodic waveform.

The quality of the synthesized waveform depends on the DAC's clock speed and bit rate. Current high speed fabrication technologies such as indium phosphide (InP) or gallium arsenide (GaAs) provide a maximum clock speed of approximately 1 GHz with 12–14 bits of resolution. The DAC's voltage levels must be allowed to settle and their ratios must be matched exactly to avoid introducing distortion into the analog waveform. This is difficult to accomplish, and thus has the effect of limiting the DAC's performance. Current digital synthesizers are capable of generating waveforms with about 10 bits of resolution at frequencies up to approximately 200 MHz to 300 MHz.

To read out the codewords at the DAC's clock speed, the memory has to be implemented in the same high speed technology as the N-bit DAC. Historically high speed technologies typically have a relatively low level of circuit integration. As a result, high speed memory is at a premium in terms of chip space and cost. Current research is directed at increasing the storage efficiency of the waveform to reduce the amount of memory required. For example, one-quarter of a period may be read out and reflected about different axis' of symmetry to regenerate a full period. In addition, the high speed readout of the N-bit codewords produces a significant amount of thermal energy that must be dissipated in the waveform generator.

In a digital generator, the frequency of the analog waveform can be changed by simply reading out the codewords faster or slower. Thus, many different sinewave frequencies can be generated by storing a fraction of the period and varying the readout rate. Due to the premium placed on memory, this is an important feature of known digital generators.

In the related fields of analog-to-digital (A/D) and digital-to-analog (D/A) real-time data conversion, delta-sigma (ΔΣ) modulation has been used in place of the conventional N-bit ADCs or DACs to improve the SNR of the converted signal. "Mixed-Signal Design Seminar," Analog Devices, Inc. Section VI:1–24, 1991 discloses a ΔΣ modulator that utilizes oversampling and noise shaping to increase the SNR of the converted signal. The ΔΣ modulator includes a comparator and a filter in a feedback loop. The comparator digitizes an input signal at a very low resolution, typically 1-bit, at a very high sampling rate relative to the signal frequency. Oversampling expands the bandwidth so that the signal spectrum occupies only a portion of the total bandwidth. The filter shapes the comparator's otherwise uniform quantization noise spectrum so that the bulk of the quantization noise occurs outside the signal spectrum. As a result, the SNR in the signal spectrum is increased dramatically with respect to a comparable N-bit ADC or DAC.

A ΔΣ DAC includes a digital interpolation filter that increases the sampling rate of the N-bit digital input signal. The sampling rate of a voiceband signal having a bandwidth of 4 kHz and an initial sampling rate of 8 kHz may be increased by a factor of 128 to a sampling rate of 1.024 MHz. The ΔΣ modulator noise-shapes the 16-bit 1.024 MHz data stream and reduces the sample width to 1-bit. Unlike the ΔΣ modulator in the ΔΣ ADC, this modulator is all digital although it performs the same function. A 1-bit DAC converts the serial bit stream into a binary analog signal, does not have the mismatch problems associated with higher resolution DACs and can be clocked at much higher rates.

The DAC's output is meaningless until it is averaged in some manner. An analog filter, whose characteristics are matched to the modulator's filter characteristics, averages the binary analog signal and thereby reduces the signal's bandwidth to the 4 kHz bandwidth of the voiceband signal and rejects the shaped quantization noise. The ΔΣ DAC produces a higher resolution analog signal than would a direct N-bit DAC. For example, using a 16-bit digital input signal, the ΔΣ DAC produces an analog signal having approximately 20 bits of resolution.

A principal drawback to ΔΣ modulators is that they are computationally intense, and hence quite slow. Using current technology, the maximum clocking speed of a ΔΣ DAC is approximately 10 MHz, which limits signal bandwidths to approximately 300 KHz with effectively 16 bits of resolution. Higher order ΔΣ modulators can be used to improve the SNR, but the additional logic circuitry required further reduces speed. Secondarily, any hardware implementation introduces some distortion into the signal due to the fixed register lengths used to perform the mathematical operations, delays and non-linearities in transistor performance.

Computer programs for simulating the ΔΣ modulation process are well known in the art and commonly used to design ΔΣ modulators for DACs. The designer can vary the modulator's parameters such as filter type (low pass or band pass) and order, register lengths, bit-rate, delay elements and clock frequency for a given N-bit input signal resolution and then simulate the results. The hardware implementations of ΔΣ modulators are complicated, and thus extensive simulations are often required to find an architecture that achieves the desired SNR performance.

To provide a standard against which the actual performance can be measured, the designer can switch the program to an ideal mode, in which those parameters associated with the ΔΣ modulator's practical limitations are set to their ideal values. For example, the registers, which are typically 14 bits, can be set to the floating point accuracy of the computer running the simulation. Boser et al. "Simulating and testing oversampled analog to digital converters," *IEEE Transactions on Computer Aided Design*, Vol. CAD-7, pp. 668–674, June 1988 discloses the theory behind one such program, which is commonly referred to as "Midas." The operational details for the Midas program are provide by Louis A. Williams et al., Stanford University, Version 2.1, 1990.

Because of their extremely low bandwidth, ΔΣ modulators have not been used in digital waveform generators, but have been limited to the conversion of real-time data for signal bandwidths below 300 KHz. If a ΔΣ modulator were used to read out and convert the N-bit codewords into the synthesized waveform, the distortion performance would improve but the maximum waveform frequency would be limited by the modulator. Such a waveform generator would have minimal practical utility.

Furthermore, the ΔΣ modulator generates a different sequence of 1s and 0s for each frequency. Thus, multiple waveforms cannot be generated from the samples of a single stored waveform. Furthermore, the reflection algorithms for improving storage efficiency are not applicable to ΔΣ modulation. Therefore, a full period of each desired waveform would have to be stored.

SUMMARY OF THE INVENTION

In view of the above problems, the present invention provides a high speed low distortion digital waveform generator.

This is accomplished by reading out simulated ΔΣ ADC data for a desired periodic analog waveform from a memory and converting it, using a low-resolution high speed DAC, into a synthesized analog waveform. The synthesizer's performance is limited by the performance of the DAC, not the ΔΣ modulator. Because the ΔΣ modulator is not implemented in hardware, the simulation can be run under ideal conditions and use higher order filters.

The preferred embodiment of the ΔΣ digital waveform generator is designed to take advantage of the natural evolution of device technologies. The memory is implemented with older technologies, which tend to be slower but have a much higher level of integration. A DAC is implemented in more recent technologies, which are faster but have less integration. A speed up buffer or buffers in intermediate speed intermediate integration technologies may be included to provide a bridge between the low speed memory and the low integration DAC. As the current technologies become more well developed, and thus more integrated, and new higher speed technologies take their place, the various components will gradually change but the architecture should remain viable and superior to known digital generators.

These and other features and advantages of the invention will be apparent to those skilled in the art from the following detailed description of preferred embodiments, taken together with the accompanying drawings, in which:

DETAILED DESCRIPTION OF THE INVENTION

The present invention digitally synthesizes analog waveforms by reading out simulated ΔΣ ADC data for a desired periodic analog waveform from a memory and converting it, using a low-resolution high speed DAC, into a synthesized analog waveform. The synthesizer's performance is limited by the performance of the DAC, not the ΔΣ modulator. Thus, using the same technologies that are used in known digital waveform generators, the ΔΣ digital waveform generator can presently synthesize waveforms up to 10 GHz with 10 bits of resolution at a clock speed of 40 GHz. Furthermore, because the ΔΣ modulator is not implemented in hardware, the simulation can be run under ideal conditions and use higher order filters.

Another important benefit of the preferred ΔΣ digital waveform generator is that its architecture is designed to take advantage of the natural evolution of device technologies. The memory is implemented with older technologies, which tend to be slower but have a much higher level of integration. This saves chip space and cost, reduces the thermal energy produced, and also helps to offset the fact that at least one period of data must be stored for each desired frequency. A DAC is implemented with more recent technologies, which are faster but have less integration. This provides the speed and accuracy necessary to generate high frequency, low distortion waveforms. A speed up buffer or buffers in intermediate speed/integration technologies may be included to provide a bridge between the low speed memory and the low integration DAC. As the current technologies become more well developed, and thus more integrated, and new higher speed technologies take their place, the various components will gradually change but the architecture should remain viable and superior to known digital generators.

Figure 1:
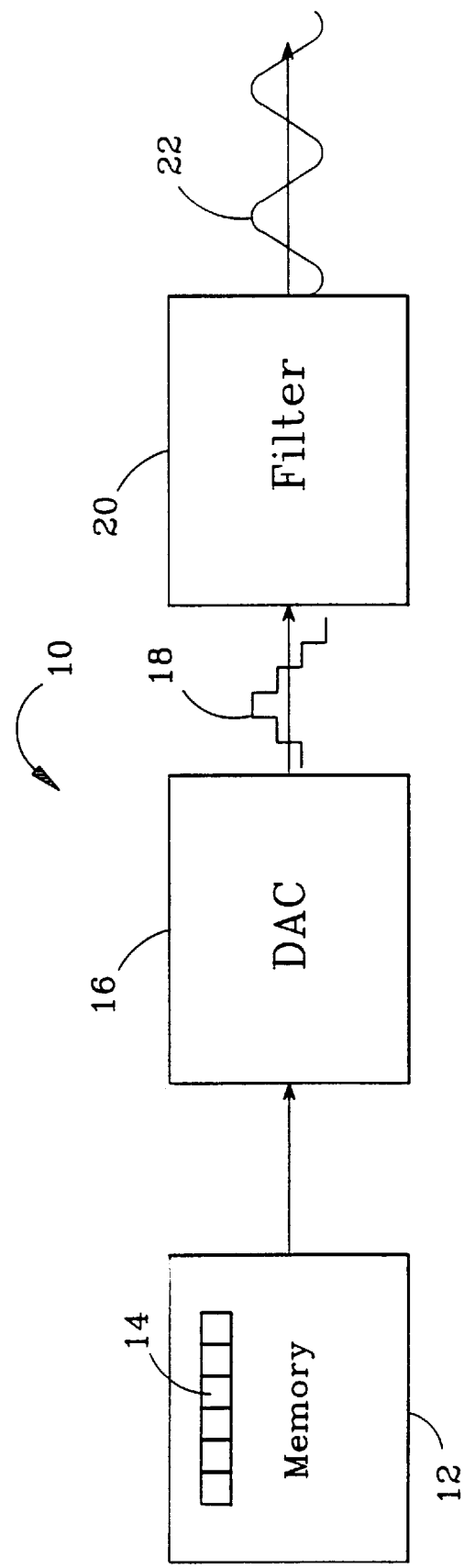
FIG. 1 is a block diagram of a digital waveform synthesizer that uses table read out of simulated ΔΣ ADC data in accordance with the present invention.

As shown in FIG. 1, a new ΔΣ digital waveform generator 10 includes a memory 12 that stores an integral number of periods of p-bit ΔΣ ADC data 14 for at least one periodic analog waveform at a specific frequency, a p-bit DAC 16 that converts the data as it is cyclically read out from the memory into a multi-level analog waveform 18, and an analog filter 20 that averages the multi-level analog waveform and rejects its shaped quantization noise to generate a synthesized waveform 22 that approximates the desired analog waveform at the specified frequency. In this implementation the memory 12, DAC 16 and filter 20 are fabricated with the same high speed low integration technology, such as indium phosphide (InP) or gallium arsenide (GaAs), so that the data can be read out at the DAC's clocking rate. Because the ΔΣ modulation function is not implemented in hardware, the performance of the waveform generator is limited by the performance of the DAC 16.

The memory 12 stores L samples of p-bit ΔΣ ADC simulation data, in which the desired waveform is oversampled and the quantization noise is shaped to shift the noise away from the waveform frequency. The data is simulated at a clock frequency equal to that of the DAC 16. The waveform's frequency is selected such that the L samples represent one or more integral periods. Specifically, the waveform's frequency is equal to an integer multiple of the simulation frequency divided by the number of samples L. Lower waveform frequencies are thus represented with fewer periods at higher oversampling rates, whereas higher frequency waveforms have more periods at lower oversampling rates. Higher oversampling can reduce distortion in a given period, whereas reading out a sequence of more periods can benefit from error averaging.

The high speed low resolution DAC 16, typically 1-bit, converts the data 14 as it is cyclically read out from the memory 12 into a multi-level analog waveform 18. With current high speed technologies, a 1-bit DAC can be clocked up to frequencies of 40 GHz without introducing distortion into the waveform. The 1-bit DAC does not have the mismatch problems associated with the higher rate DACs used in known digital waveform generators and can be clocked at much higher speeds. The amplitude of the synthesized waveform is preferably adjusted by scaling the output levels of the DAC. As a result, the noise floor tracks the desired amplitude so that the synthesized waveform's SNR remains constant.

Figure 3A:
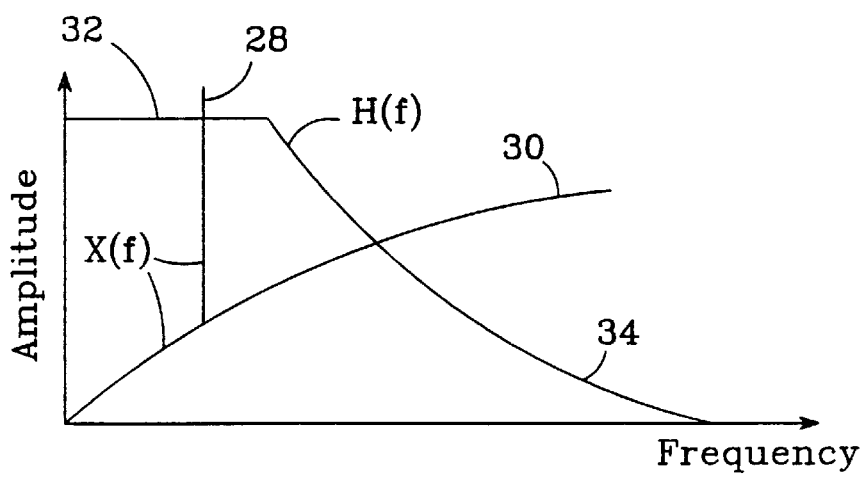
FIGS. 3a and 3b are plots of the transfer functions for low-pass and band pass implementations, respectively, of the output filter shown in FIG. 1.
Figure 3B:
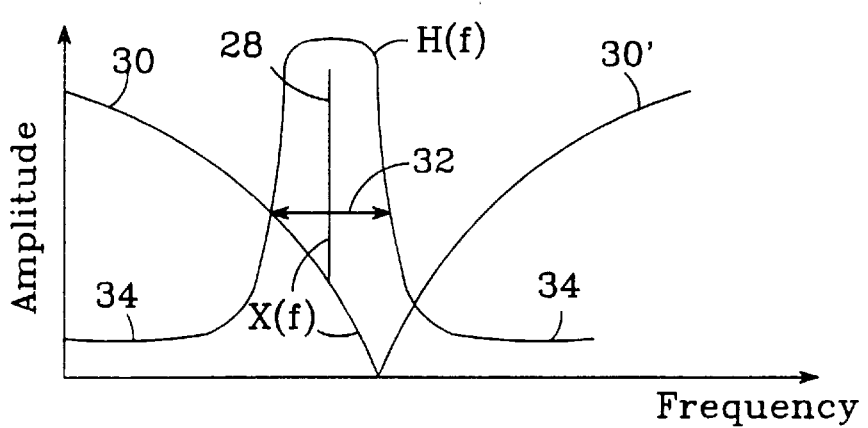

The analog filter 20 averages the otherwise meaningless output of the DAC 16 to generate the selected periodic analog waveform, remove the shaped quantization noise that resides outside the waveform bandwidth, and reject any images of the selected waveform that occur due to sampling. As shown in FIGS. 3a and 3b the analog filter 20 can be a low pass or band pass filter, depending upon the waveform frequency and SNR requirements. In either case, the order of the filter 20 should be at least one more than the filter used in the simulation to ensure that out-of-band quantization noise is rejected.

Figure 2:
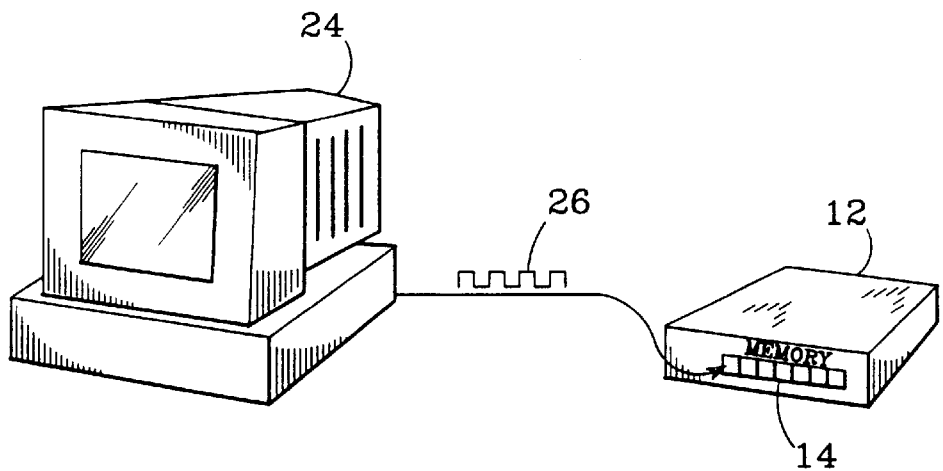
FIG. 2 is a block diagram illustrating the simulation and storage of the ΔΣ ADC data for use in the synthesizer shown in FIG. 1.

As shown in FIG. 2, a computer 24 is programmed to simulate a ΔΣ modulator with, for example, the well known Midas program. Because the ΔΣ modulator is not implemented in hardware, a designer can use the simulator in its ideal mode such that the only noise in the bit stream is attributable to quantization. The designer selects as inputs the simulated clock frequency, a desired periodic analog waveform, its frequency, the bit width p of the ΔΣ modulator, and the modulator's filter type and order. The simulated clock frequency is equal to the DAC's clock frequency, which is preferably the maximum clock frequency supported by the high speed fabrication technology. The modulator's filter type is selected in accordance with the analog filter and its order is at least one less than the analog filter's. Since the ΔΣ modulator is not implemented in hardware, a designer has more freedom to use higher order filters, and thus obtain higher SNRs. A higher order analog filter must be implemented, but this is far less complicated than the modulator's digital filter. The computer 24 generates a bit stream 26, of which the sequence of L data samples 14 are stored in the memory 12.

FIGS. 3a and 3b are plots of the multi-level analog waveform's and analog filter's frequency responses for low pass and band pass filter implementations, respectively. The waveform's frequency response X(f) includes a signal component 28 and a noise component 30, which has been shaped by the modulator's digital filter to move the noise away from the frequency of the signal component 28. The analog filter's frequency response H(f) includes a passband 32 that passes the signal component 28 and a stopband 34 that rolls off at least one order of magnitude faster than the quantization noise increases so that it effectively suppresses the out-of-band noise. The selection of a low pass or band pass filter depends upon the specific waveform frequency and SNR requirements of a given application. The design of low pass and band pass active filters is well known in the art, and is described by Paul Horowitz, "The Art of Electronics," Cambridge University Press, pages 263–283, 1989 and by Wai-Kai Chen, Editor-in-Chief, "The Circuits and Filters Handbook," *CRC Press*, pages 2339–2371, 1995.

As shown in FIG. 3a, the signal component 28 has a relatively low frequency. The modulator's digital filter, whose amplitude response is low pass and may be proportional to 1/f, looks like a high-pass filter to the quantization noise. As a result the noise component 30 is greatly reduced at the low frequencies near the signal component and shifted to the higher frequencies. The analog filter 20 passes the signal component 28 and removes the shaped quantization noise. In a low pass filter implementation, the frequency of the signal component must be much less than the simulation and DAC frequencies to provide adequate resolution in the synthesized waveform.

As shown in FIG. 3b, the signal component 28 has a relatively high frequency. The modulator's digital filter, whose amplitude response is a band pass filter, looks like a band stop filter to the quantization noise so that the noise component 30 is greatly reduced at the frequencies near the signal component 28 and shifted to the lower and higher frequencies. The analog filter 20 passes the signal component 28 and removes the shaped quantization noise. The band pass filter implementation has the advantage that the frequency of the signal component can be as high as approximately one-quarter the simulation and DAC frequencies. However, the band pass filter can be more difficult to implement.

Figure 4:
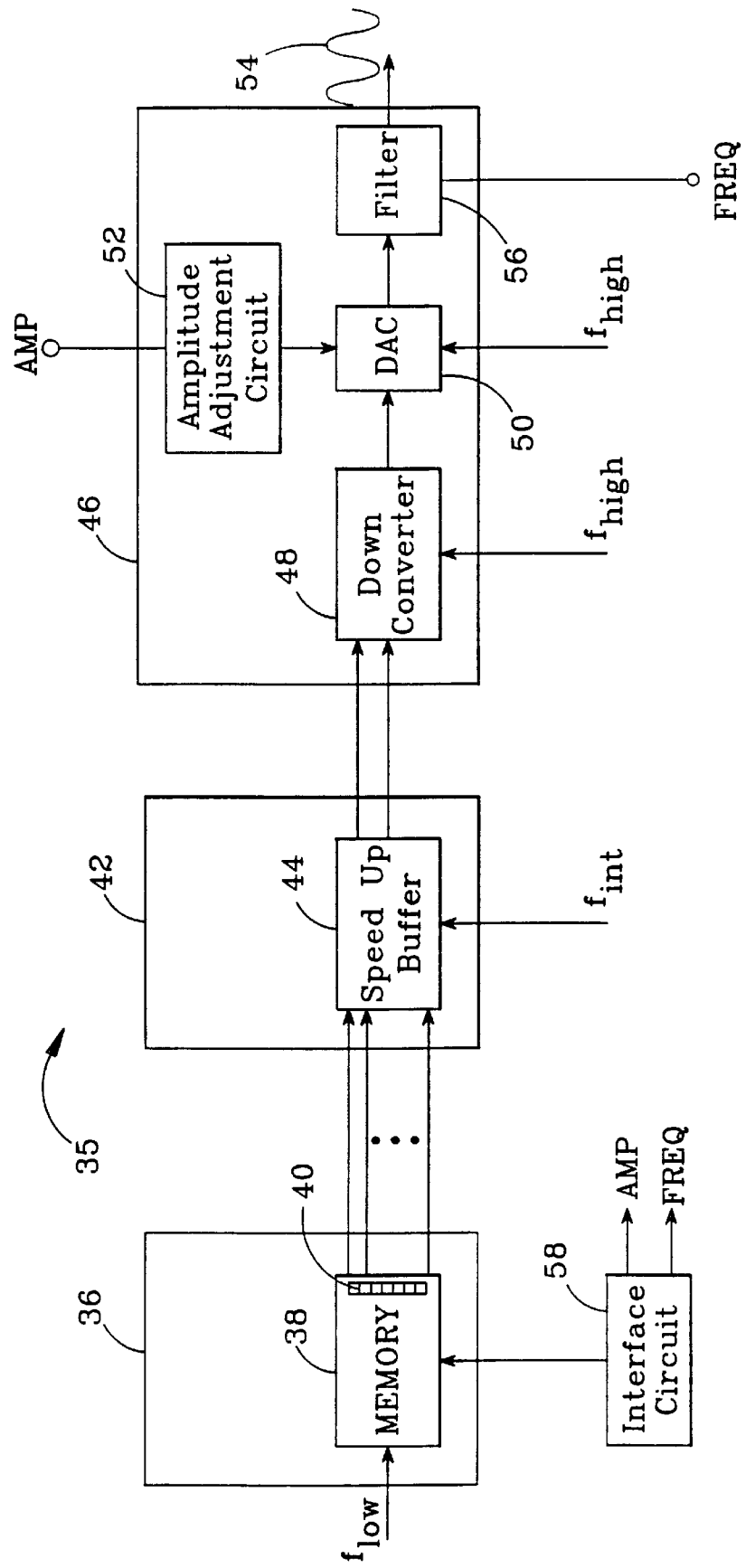
FIG. 4 is a block diagram of a preferred embodiment of the digital waveform synthesizer shown in FIG. 1.

FIG. 4 illustrates a preferred embodiment of the ΔΣ digital waveform generator 35 in which the memory 12 is fabricated in a low speed, high integration technology such as silicon CMOS to reduce cost, space and thermal dissipation, and the DAC 16 is fabricated in a high speed, low integration technology such as InP or GaAs bipolar to increase speed and reduce distortion. Although the memory is clocked at a much lower speed than the DAC, the information rates read out from the memory and converted by the DAC must be equal. Thus, N-bit words are read out of the memory in parallel in response to a low frequency clock signal and then converted into the p-bit words in response to a high frequency clock signal. The low frequency clock signal is preferably set at the highest frequency supported by the memory's technology to minimize N. Depending upon the gap between the two technologies, the downconverter in the high speed technology may not be able to downconvert N bits simultaneously. In these cases, one or more speed up buffers fabricated in intermediate speed intermediate integration technologies such as silicon bipolar or silicon-germanium bipolar are used to bridge the gap by successively downconverting the data into shorter words at higher frequencies.

A memory IC chip 36, fabricated with a low speed high integration technology includes a memory 38 such as random access memory (RAM) or read only memory (ROM) that stores sequences 40 of L samples of p-bit ΔΣ ADC data that respectively represent an integral number of periods for different periodic analog waveforms, in which the desired waveform is oversampled and the quantization noise is shaped to shift the noise away from the waveform frequency. The memory 38 is configured to cyclically read out blocks of N bits in parallel. The memory is clocked with a low frequency clock signal $f_{low}$ which is generated either externally or internally, to read out the successive blocks of N bits. Once the entire sequence has been read out, it cycles back to the beginning and repeats indefinitely.

A speed up chip 42 fabricated with a intermediate speed intermediate integration technology includes a speed up buffer 44 that converts the N bits of simulated data at $f_{low}$ into N/A bits of data in response to an intermediate frequency clock signal $f_{int}$ equal to $Axf_{low}$. This reduces the number of bits that are in parallel while maintaining the information rate read out from the memory 38. The use of one or more speed up chips allows a designer to use the fastest technology to fabricate the DAC and the most highly integrated technology to fabricate the memory.

A conversion chip 46 fabricated with a high speed low integration technology includes a parallel-to-serial converter 48 (when p=1) that converts the successive N/A bits from parallel to a serial bitstream in response to a high frequency clock signal $f_{high}$ while maintaining the information rate. A 1-bit DAC 50 is clocked at $f_{high}$ to convert the serial bitstream into a binary analog signal. To enhance the information rate, the high frequency clock signal is preferably selected to be the maximum clock frequency that can be supported by the technology and that does not introduce distortion into the analog signal. An amplitude adjustment circuit 52 responds to a control signal AMP, which represents the desired amplitude of the synthesized waveform 54, by scaling the binary levels of the analog signal. In this manner the quantization noise floor tracks the waveform amplitude to hold its SNR constant.

An analog filter 56 averages the binary analog waveform to reject the shaped quantization noise and generate the synthesized waveform 54. The filter 56 can be selected from a bank of low pass or band pass fixed frequency active filters that correspond to the simulation characteristics of the different periodic analog waveforms that are stored in the memory 38. Preferably, the filter 56 is implemented as a single tunable filter that responds to a control signal FREQ to tune its frequency response to the filter used in the ΔΣ modulator simulation and to the frequency of the selected waveform. An interface circuit 58 is used to select a particular waveform from the memory 38 for synthesis, to adjust the amplitude of the synthesized waveform 54, and to generate the control signal FREQ which tunes the filter 56 to the characteristics of the selected waveform.

Known tunable active filters that could be used to implement analog filter 56 are disclosed in a) Heij et al, "Transconductor and Integrator Circuits for Integrated Bipolar Video Frequency Filters," *Proceeding of ISCAS*, 1989, pp. 114–117, b) Voorman et al, "Integration of Analog Filters in a Bipolar Process," *IEEE Journal of Solid State Circuits*, vol. SC-17, pp. 713–722, Aug. 1982, and c) Veirman et al, "Design of a Bipolar 10 Mhz Programmable Continuous Time 0.05° Equiripple Linear Phase Filter," *IEEE Journal of Solid-State Circuits*, vol. SC-27, pp. 324–331, March 1992.

Although adequate, these approaches have limited tuning range and relatively low differential mode resistance. A preferred tunable transconductance cell and positive current source for use in a tunable active filter are disclosed in U.S. patent application Ser. No. 08/588,665 entitled "NPN Bipolar Circuit Topology for a Tunable Transconductance Cell and Positive Current Source" filed Jan. 17, 1996 and assigned to Hughes Electronics, the assignee of the present invention, which is incorporated herein by reference.

Figure 5:
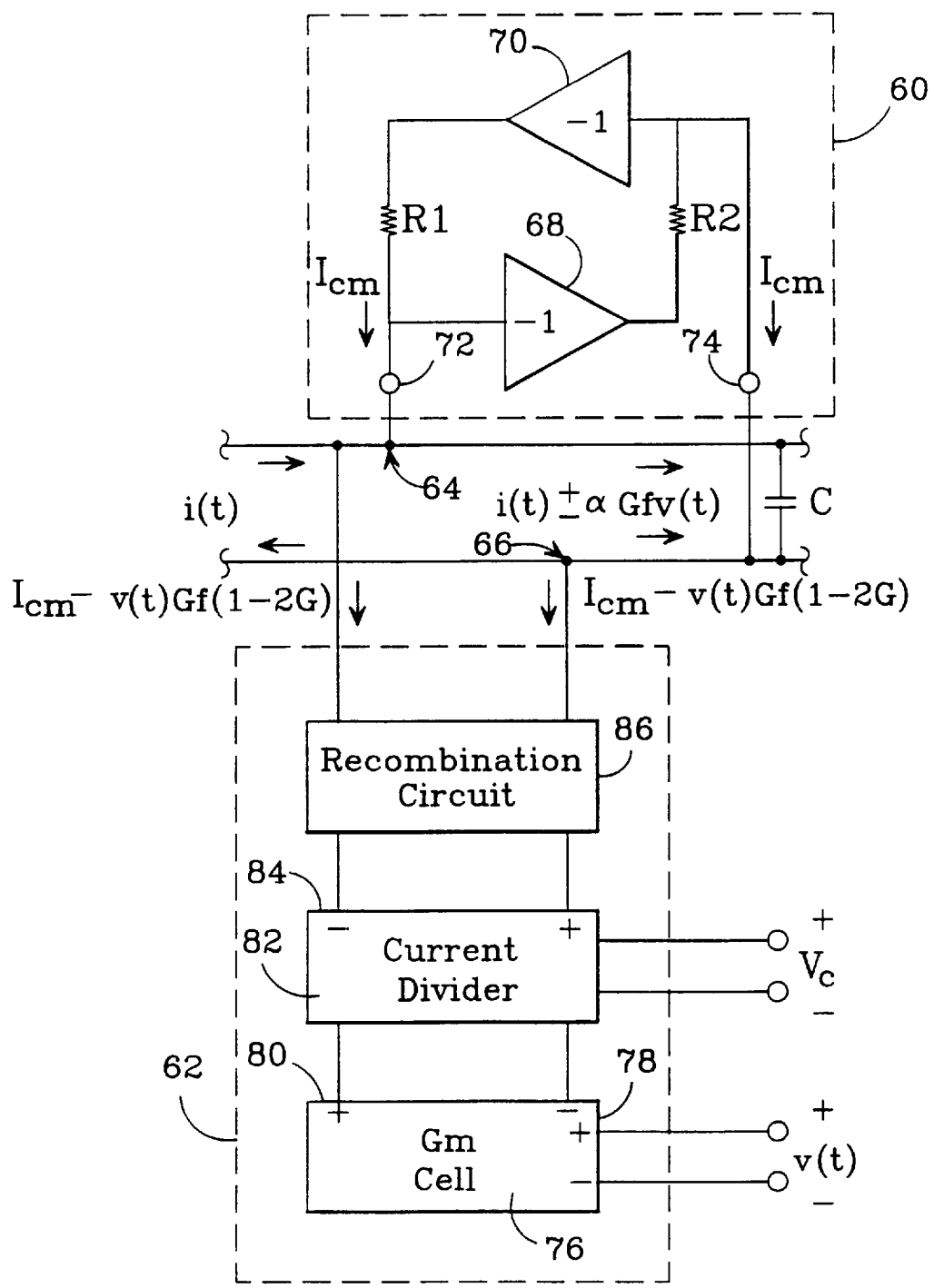
FIG. 5 is a schematic diagram of a preferred tunable transconductance cell and positive current source for use in the tunable analog filter shown in FIG. 4.

FIG. 5 (FIG. 1 in the pending application) shows a portion of a tunable active filter in which a (PCS) 60 and a tunable Gm cell 62 are connected differentially to a pair of current summing nodes 64 and 66. The connections of these circuit elements would depend upon the particular implementation of the analog filter 56 shown in FIG. 4, i.e. low or band pass and the filter order.

The PCS 60 supplies a pair of common mode currents $I_{cm}$, which are differentially modulated by the Gm cell 62. It has a small common mode impedance of R/2 such that a change in the common mode component of the input current i(t) induces only a small change in the common mode voltages at summing nodes 64 and 66. Thus, the active filter maintains a stable common mode operating point. Furthermore, the PCS has a very large differential mode impedance, theoretically infinite, such that substantially all of the differential signal current is driven into an integration capacitor C. The tunable Gm cell differentially modulates the common mode currents $I_{cm}$ by $\pm\alpha\, G_f v(t)$, where $|\alpha|\leq 1$, $G_f$ is a fixed transconductance and v(t) is a voltage signal, while maintaining a common mode current $I_{cm}$ that is independent of α. This allows the cell's transconductance, and hence the filter's resonant frequency, to be varied over a wide range while maintaining a high quality factor.

The PCS 60 includes a pair of unity gain inverting amplifiers 68 and 70 that are connected in anti-parallel across a pair of matched resistors R1 and R2 having resistance $R_0$. A constant voltage V1 is applied across the resistors R1 and R2 to supply the common mode currents $I_{cm}$ at output terminals 72 and 74, which route the current to summing nodes 64 and 66, respectively. A change in the common mode voltage Δv at output terminals 72 and 74 produces a voltage change across the resistors of 2αv. Thus, the PCS has a common mode impedance of $R_0/2$, which is small enough to maintain a stable common mode operating point with process variations providing negligible impact. A change in the differential mode voltage of +Δv at terminal 72 and of −αv at terminal 74 does not affect the voltage across resistors R1 and R2. Thus, the PCS has an ideal differential mode impedance of infinity. In practice, the differential mode impedance can be several orders of magnitude larger than the common mode impedance, which allows a high Q to be maintained.

The tunable Gm cell 62 includes a fixed Gm cell 76 that has transconductance $G_f$. The application of a differential voltage signal v(t) to the Gm cell's differential input 78 produces a differential mode current signal $\pm v(t)G_f$ that is imposed on the common mode current signals $I_{cm}$ at its differential output 80. A current divider 82 varies the cell's transconductance by splitting the current signals into two pair of branches and routing the current from one branch in each pair to the current divider's differential output 84. The apportionment of current between the two branches, and hence α, is set by a control voltage $V_c$. At this point, both the common mode and differential mode signals are a function of α. To remove the common mode signal's dependency on α, the portion of the common mode signal that was removed by the current divider is added back into the signal path by a recombination circuit 86 so that the differential mode current signals $\pm v(t)G_f$ are scaled by α and the common mode current signals $I_{cm}$ are independent of α.

The recombination circuit 86 is preferably implemented by cross-coupling the second branches in each pair to the differential output 84. This both removes the α dependency and doubles the effect of splitting the current, which allows α to range from +1 to –1. Alternately, the same effect can be accomplished by providing another Gm cell and current divider that are driven by the same voltage signal v(t) and control voltage Vc and cross-coupling that current divider's second branches to the differential output 84. However, this requires twice the number of components and may not completely eliminate the common mode signal's dependence upon α if there is any mismatch between the components. In the alternate embodiment, the second Gm cell can be eliminated with the only effect being that α is constrained to be between 0 and +1.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A digital waveform generator for generating periodic analog waveforms, comprising:

a memory that stores a sequence of L samples of 1-bit delta-sigma (ΔΣ) analog-to-digital conversion data generated at a simulation frequency where L is equal to an integer multiple of said simulation frequency divided by a specified waveform frequency and said L samples represent an integral number of periods of a periodic analog waveform at said specified waveform frequency, said L samples thereby including quantization noise that is shifted in frequency away from said waveform frequency, said memory having an input for receiving a first clock signal that cyclically reads out the data from said sequence at a constant information rate;

a 1-bit digital-to-analog converter (DAC) that converts said data into an analog waveform in response to a second clock signal; and an output filter that averages said analog waveform and removes said shifted quantization noise to produce a synthesized waveform at said waveform frequency that approximates said periodic analog waveform.

2. The digital waveform generator of claim 1, further comprising an integrated circuit (IC) chip that includes said memory and said 1-bit DAC so that said first and second clock signals have substantially the same frequency.

3. A digital waveform generator for generating periodic analog waveforms, comprising:

a memory that stores a sequence of L samples of 1-bit delta-sigma (ΔΣ) analog-to-digital conversion data generated at a simulation frequency where L is equal to an integer multiple of said simulation frequency divided by a specified waveform frequency such that said L samples represent an integral number of periods of a periodic analog waveform at said specified waveform frequency, and which includes quantization noise that is shifted in frequency away from said waveform frequency, said memory having an input for receiving a first clock signal that cyclically reads out the data from said sequence at a constant information rate;

a 1-bit digital-to-analog converter (CAD) that converts said data into an analog waveform in response to a second clock signal;

an output filter that averages the analog waveform and removes the shifted quantization noise to produce a synthesized waveform at said waveform frequency that approximates the periodic analog waveform;

a first relatively low speed high integration chip that includes said memory, said memory being configured to read out N-bit words at a time in response to the first clock signal; and a second relatively high speed low integration chip that includes a parallel-to-serial converter that converts successive N-bit words into N 1-bit words in response to the second clock signal, said CAD and said output filter, said second clock signal having a frequency that is N times the frequency of said first clock signal so that the information rate read out of the memory equals that set by the CAD and the data read out of said memory is identical to the data presented to the CAD.

4. The digital waveform generator of claim 3, wherein said information rate is limited by the maximum frequency of the second clock signal that can be supported by the second chip to clock said DAC without introducing distortion, said DAC being clocked at said maximum frequency to maximize said information rate.

5. The digital waveform generator of claim 4, wherein said memory is clocked at the maximum frequency of the first clock signal that is supported by the first chip such that the number of bits N read out in parallel in response to said first clock signal satisfies the maximum information rate set by the DAC.

6. The digital waveform generator of claim 4, wherein the simulation frequency of said 1-bit ΔΣ ADC data is equal to said maximum frequency of the second clock signal at which the DAC is clocked.

7. A digital waveform generator for generating periodic analog waveforms, comprising:

a first relatively low speed high integration chip that includes a memory that stores a sequence of p-bit delta-sigma (ΔΣ) analog-to-digital conversion data, said sequence representing an integral number of periods of a periodic analog waveform having a known waveform frequency, and includes quantization noise that is shifted in frequency away from said waveform frequency, said memory having an input for receiving a first clock signal that cyclically reads out N-bit words from said sequence at a constant information rate;

a second relatively high speed low integration chip that includes a downconverter that converts successive N-bit words into multiple p-bit words in response to a second clock signal, a p-bit digital-to-analog converter (DAC) that converts each successive p-bit word into an analog waveform in response to a second clock signal, and an output filter that averages the analog waveform and removes the shifted quantization noise to produce a synthesized waveform at said waveform frequency that approximates the periodic analog waveform, said second clock signal having a frequency that is N times the frequency of said first clock signal so that the information read out of the memory equals that set by the DAC, said second chip's relatively low levels of circuit integration limiting the number of bits that the downconverter can convert at each cycle of the second clock signal to N/A bits; and a third intermediate speed intermediate integration chip that includes a speedup buffer, said speedup buffer responding to a third clock signal whose frequency lies between that of the first and second clock signals to convert successive N-bit words into N/A bit words at the constant information rate such that said downconverter converts successive N/A bits into p-bit words in response to the second clock signal.

8. The digital waveform generator of claim 7, wherein said first chip is silicon CMOS, said third chip is silicon bipolar, and said second chip is indium phosphide bipolar.

9. A digital waveform generator for generating periodic analog waveforms, comprising:
a memory that stores a sequence of L samples of 1-bit delta-sigma (ΔΣ) analog-to-digital conversion data generated at a simulation frequency where L is equal to an integer multiple of said simulation frequency divided by a specified waveform frequency such that said L samples represent an integral number of periods of a periodic analog waveform at said specified waveform frequency, and which includes quantization noise that is shifted in frequency away from said waveform frequency, said memory having an input for receiving a first clock signal that cyclically reads out the data from said sequence at a constant information rate;
a 1-bit digital-to-analog converter (DAC) that converts each successive 1-bit word into an analog waveform in response to a second clock signal; and
an output filter that averages the analog waveform and removes the shifted quantization noise to produce a synthesized waveform at said waveform frequency that approximates the periodic analog waveform;
wherein said quantization noise in said sequence has a null near said waveform frequency and a band stop shape that rolls off with a known order, said output filter comprising a band pass filter that tracks the waveform frequency to produce the synthesized waveform and whose order is at least one greater than that of the quantization noise.

10. A digital waveform generator for generating periodic analog waveforms, comprising:
a memory that stores a sequence of L samples of 1-bit delta-sigma (ΔΣ) analog-to-digital conversion data generated at a simulation frequency where L is equal to an integer multiple of said simulation frequency divided by a specified waveform frequency such that said L samples represent an integral number of periods of a periodic analog waveform at said specified waveform frequency, and which includes quantization noise that is shifted in frequency away from said waveform frequency, said memory having an input for receiving a first clock signal that cyclically reads out the data from said sequence at a constant information rate;
a 1-bit digital-to-analog converter (DAC) that converts each successive 1-bit word into an analog waveform in response to a second clock signal; and
an output filter that averages the analog waveform and removes the shifted quantization noise to produce a synthesized waveform at said waveform frequency that approximates the periodic analog waveform;
wherein said 1-bit DAC converts each 1-bit word into a selected one of a plurality of waveform levels, further comprising an amplitude adjustment circuit that scales the waveform levels to adjust the amplitude of the synthesized waveform, said synthesized waveform having a constant signal-to-noise ratio (SNR) regardless of amplitude.

11. A digital waveform generator for generating periodic analog waveforms, comprising:
a memory chip having a relatively low speed and high level of circuit integration that stores a sequence of 1-bit delta-sigma (ΔΣ) analog-to-digital conversion data, said sequence representing an integral number of periods of a periodic analog waveform having a known waveform frequency, and includes quantization noise that is shifted in frequency away from said waveform frequency, said memory being configured to cyclically read out N-bit words from said sequence at a constant information rate in response to a low frequency clock signal;
a speed up chip having a relatively intermediate speed and intermediate level of circuit integration that converts successive N-bit words into N/A-bit words in response to an intermediate frequency clock signal that maintains the constant information rate; and
a conversion chip having a relatively high speed and low level of circuit integration that comprises:
a parallel-to-serial converter that converts the next N/A bits into a serial bit stream in response to a high frequency clock signal;
a 1-bit digital-to-analog converter (DAC) that converts the serial bit stream into an analog waveform having binary levels at said high frequency clock signal;
an amplitude adjustment circuit for scaling the binary levels; and
an output filter that averages the scaled analog waveform and rejects the shifted quantization noise to produce a synthesized waveform at said waveform frequency that approximates the periodic analog waveform with a constant signal-to-noise ratio that is independent of the synthesized waveform's amplitude.

12. The digital waveform generator of claim 11, wherein said information rate is limited by the maximum frequency of the high frequency clock signal that can be supported by the conversion chip to clock said DAC without introducing distortion, said DAC being clocked at said maximum frequency to maximize said information rate.

13. The digital waveform generator of claim 12, wherein said memory chip is clocked at the maximum frequency of the low frequency clock signal that is supported by the memory chip such that the number of bits N read out in parallel in response to said low clock signal satisfies the maximum information rate set by the DAC.

14. The digital waveform generator of claim 12, wherein said 1-bit ΔΣ ADC data has a simulation frequency equal to said maximum frequency of the high frequency clock signal.

15. The digital waveform generator of claim 14, wherein said sequence includes L samples of the periodic analog waveform where L is equal to an integer multiple of said simulation frequency divided by the waveform frequency such that said sequence represents an integral number of periods of the periodic analog waveform.

16. The digital waveform generator of claim 15, wherein the only noise in said sequence is said quantization noise.

17. The digital waveform generator of claim 11, wherein said quantization noise in said sequence has a null near said waveform frequency and a band stop shape that rolls off with a known order, said output filter comprising a band pass filter that tracks the waveform frequency to produce the synthesized waveform and whose order is at least one greater than that of the quantization noise.

18. A simulator for generating and storing 1-bit data in a memory for use in a digital generator that cyclically reads out N-bit words of the data in response to a relatively low frequency clock signal, downconverts the words into 1-bit data in response to a relatively high frequency clock signal, converts it into an analog waveform and filters the analog waveform to produce a synthesized waveform at a specified waveform frequency, said simulator comprising:

a computer that is programmed to simulate a 1-bit delta-sigma ($\Delta\Sigma$) analog-to-digital conversion modulator and receives as inputs a selection of a periodic analog waveform, the specified waveform frequency, a simulator clock frequency, a filter type and its order and outputs a bit stream which includes quantization noise that is shaped away from said waveform frequency; and a memory that stores L samples of the periodic analog waveform with a resolution of 1-bit per sample, and which is configured for cyclical read out of successive N-bit words of said L samples, said specified waveform frequency being equal to an integer multiple of said simulator clock frequency divided by the number of samples L such that the L samples represent an integral number of periods of the periodic analog waveform.

19. The simulator of claim 18, wherein said simulator clock frequency is set equal to the maximum value of the high frequency clock signal.

20. The simulator of claim 18, wherein said $\Delta\Sigma$ ADC modulator is simulated under ideal conditions so that the only noise in the bit stream is the quantization noise.

21. A digital waveform generator for generating periodic analog waveforms, comprising:

a computer that is programmed to simulate a p-bit delta-sigma ($\Delta\Sigma$) analog-to-digital conversion (ADC) modulator and receives as inputs a selection of a periodic analog waveform, a waveform frequency, a simulator clock frequency, a filter type and its order and outputs a bitstream that includes quantization noise that is shaped away in frequency from said waveform frequency;

a memory chip having a relatively low speed and level of circuit integration that stores L samples of said bitstream at a resolution of p-bits per sample, said waveform frequency being equal to an integer multiple of said simulator clock frequency divided by the number of samples L such that the L samples represent an integral number of periods of the periodic analog waveform, said memory being configured to cyclically read out N-bit words in parallel from said sequence at a constant information rate equal to the product of the simulator clock frequency and the p-bits per sample in response to a low frequency clock signal; and a conversion chip having a relatively high speed and low level of circuit integration comprising:
a downconverter that converts successive N bit words at the low frequency clock signal into a p-bit bit stream at a high frequency clock signal that maintains the constant information rate;
a p-bit digital-to-analog converter (DAC) that converts the p-bit bit stream into a multi-level analog waveform at said high frequency clock signal; and
an output filter that averages the analog waveform and removes the shifted quantization noise to produce a synthesized waveform at said waveform frequency that approximates the periodic analog waveform.

22. The digital waveform generator of claim 21, wherein said information rate is limited by the maximum frequency of the high frequency clock signal that can be supported by the conversion chip to clock said DAC without introducing distortion, said DAC being clocked at said maximum frequency to maximize said information rate.

23. The digital waveform generator of claim 22, wherein said conversion chip's relatively low levels of circuit integration limits the number of bits that the downconverter can convert at each cycle of the high frequency clock signal to N/A bits, said generator further comprising:

a speed up chip having an intermediate speed and intermediate level of circuit integration that includes a speedup buffer, said speedup buffer responding to an intermediate frequency clock signal whose frequency lies between that of the low and high clock signals to convert successive N-bit words into N/A-bit words at the constant information rate such that said downconverter converts the next N/A bits into p-bit words in response to the high frequency clock signal.

24. The digital waveform generator of claim 22, wherein said p-bit DAC converts each p-bit word into a selected one of a plurality of waveform levels, said conversion chip further comprising an amplitude adjustment circuit that scales the waveform levels to adjust the amplitude of the synthesized waveform so that it has a constant signal-to-noise ratio (SNR) regardless of amplitude.

25. A method of generating periodic analog waveforms, comprising:

selecting a periodic analog waveform, a waveform frequency, a simulation frequency, a bit rate p, and a filter order;

simulating a p-bit delta-sigma ($\Delta\Sigma$) analog-to-digital conversion (ADC) modulator for the selected periodic analog waveform and frequency with said filter order at said simulation frequency to output a bitstream that includes quantization noise that is shaped in frequency away from said waveform frequency;

storing L samples of said bitstream at p-bits per sample where L is equal to an integer multiple of said simulation frequency divided by the waveform frequency such that said L samples represent an integral number of periods of the periodic analog waveform at said waveform frequency;

cyclically reading out the samples at a constant information rate;

converting the p-bit words into a multi-level analog waveform at the simulation frequency to maintain the constant information rate; and filtering the analog waveform with an output filter whose order is at least one greater than the filter order used in the simulation to average the analog waveform and remove the shaped quantization noise to produce a synthesized waveform at said waveform frequency that approximates the periodic analog waveform.

26. A method of generating periodic analog waveforms, comprising:

selecting a periodic analog waveform, its frequency, a simulation frequency, a bit rate p, and a filter order;

simulating a p-bit delta-sigma ($\Delta\Sigma$) analog-to-digital conversion (ADC) modulator for the selected periodic analog waveform and frequency with said filter order at said simulation frequency to output a bitstream that includes quantization noise that is shaped in frequency away from said waveform frequency;

storing L samples of said bitstream at p-bits per sample in memory having a relatively low speed and high level of circuit integration, said L samples representing an integral number of periods of the periodic analog waveform;

cyclically reading out the samples in parallel as N-bit words in response to a low frequency clock signal at a constant information rate;

converting successive N-bit words into p-bit words in response to a high frequency clock signal using a converter having a relative high speed and low level of circuit integration;

converting the p-bit words into a multi-level analog waveform in response to the high frequency clock signal using a digital-to-analog converter (DAC) having the same high speed and low level of circuit integration as said converter such that the information rate remains constant; and filtering the analog waveform with an output filter whose order is at least one greater than the filter order used in the simulation to average the analog waveform and remove the shaped quantization noise to produce a synthesized waveform at said waveform frequency that approximates the periodic analog waveform.

27. The method of claim 26, wherein said high frequency clock signal and said simulation frequency are equal and set to the maximum frequency of the high frequency clock signal that can be supported by the converter.

28. The method of claim 27, wherein the number of samples L is equal to an integer multiple of said simulation frequency divided by the waveform frequency such that said sequence represents an integral number of periods of the periodic analog waveform.

29. The method of claim 26, wherein said converter has a maximum number of bits that can be converted at each cycle of the high frequency clock signal where the maximum number is less than N, further comprising downconverting the N-bit words into a plurality of intermediate words having word lengths that do not exceed the maximum number while maintaining the constant information rate, said converter converting the intermediate words into the p-bit words in response to the high frequency clock signal.

30. The method of claim 25, further comprising:

scaling the amplitudes of the multi-level analog waveform to adjust the amplitude of the synthesized waveform so that it has a constant signal-to-noise ratio (SNR) independent of its amplitude.

31. A digital waveform generator for generating periodic analog waveforms, comprising:

a memory that stores a plurality of sequences representing the same periodic analog waveform at different discrete waveform frequencies, said sequences including L samples of 1-bit delta-sigma ($\Delta\Sigma$) analog-to-digital conversion data generated at a simulation frequency where L is equal to respective integer multiples of said simulation frequency divided by the respective waveform frequencies such that said L samples represent different integral numbers of periods of the periodic analog waveform at the discrete waveform frequency, said analog waveforms having quantization noise that is shifted in frequency away from said waveform frequency, said memory having an input for receiving a first clock signal that cyclically reads out the data from one said sequence at a constant information rate;

an interface circuit for selecting one of said sequences;

a 1-bit digital-to-analog converter (DAC) that is clocked at the simulation frequency to converts each successive 1-bit word into an analog waveform that maintains the constant information rate; and an output filter that averages the analog waveform and removes the shifted quantization noise to produce a synthesized waveform at the selected discrete waveform frequency that approximates the periodic analog waveform.

32. The digital waveform generator of claim 31, further comprising:

a first relatively low speed high integration chip that includes said memory, said memory being configured to read out N-bit words at a time in response to the first clock signal; and a second relatively high speed low integration chip that includes a parallel-to-serial converter that is clocked at the simulation frequency to convert successive N-bit words into N 1-bit words, said DAC and said output filter, said simulation frequency being N times the frequency of said first clock signal so that the information rate read out of the memory equals that set by the DAC and the data read out of said memory is identical to the data presented to the DAC.

33. The digital waveform generator of claim 32, wherein said second chip's relatively low levels of circuit integration limits the number of bits that the downconverter can convert at the simulation frequency to N/A bits, said generator further comprising:

a third intermediate speed intermediate integration chip that includes a speedup buffer, said speedup buffer responding to a third clock signal whose frequency lies between that of the first clock signal and the simulation frequency to convert successive N-bit words into N/A bit words at the constant information rate such that said downconverter converts the next N/A bits into 1-bit words at said simulation frequency.

34. The digital waveform generator of claim 31, wherein said quantization noise in said sequence has a null near said waveform frequency and a band stop shape that rolls off with a known order, said output filter comprising a band pass filter that tracks the specified discrete waveform frequency to produce the synthesized waveform and whose order is at least one greater than that of the quantization noise.

35. The digital waveform generator of claim 31, wherein said 1-bit DAC converts each 1-bit word into binary waveform levels, further comprising an amplitude adjustment circuit that scales the waveform levels to adjust the amplitude of the synthesized waveform, said synthesized waveform having a constant signal-to-noise ratio (SNR) regardless of amplitude.

* * * * *